March 4, 1958   E. J. SEBESTYEN   2,825,604
CHANGE-OVER MEANS FOR PNEUMATIC LINES
Filed July 26, 1956   3 Sheets-Sheet 2
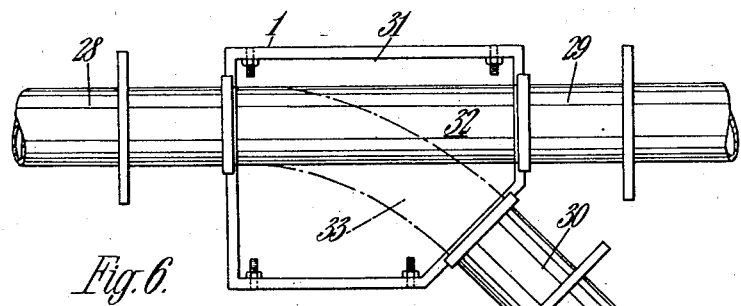
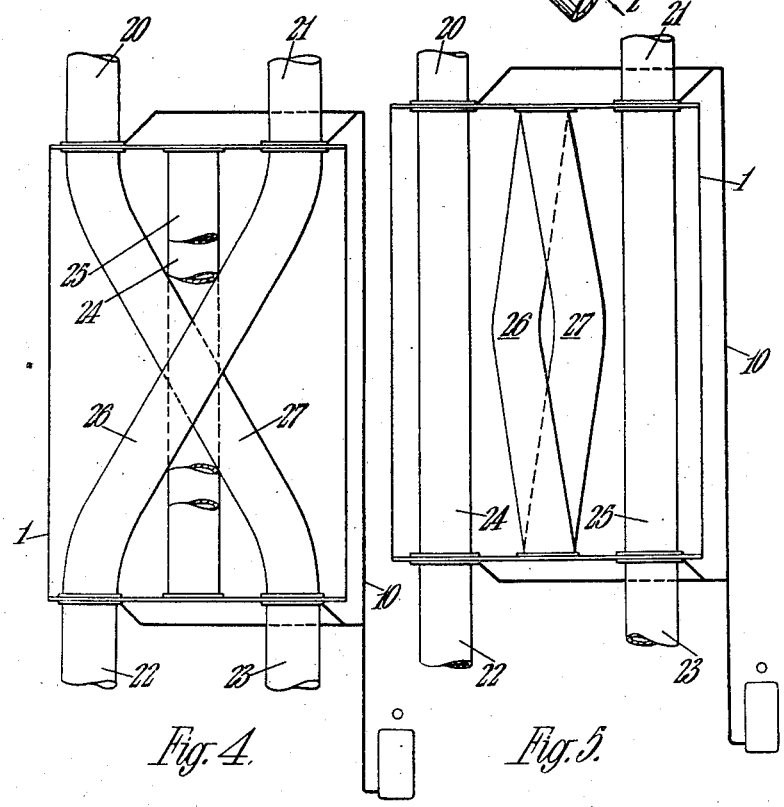
Inventor
E. J. Sebestyen March 4, 1958 E. J. SEBESTYEN 2,825,604
CHANGE-OVER MEANS FOR PNEUMATIC LINES
Filed July 26, 1956 3 Sheets-Sheet 3

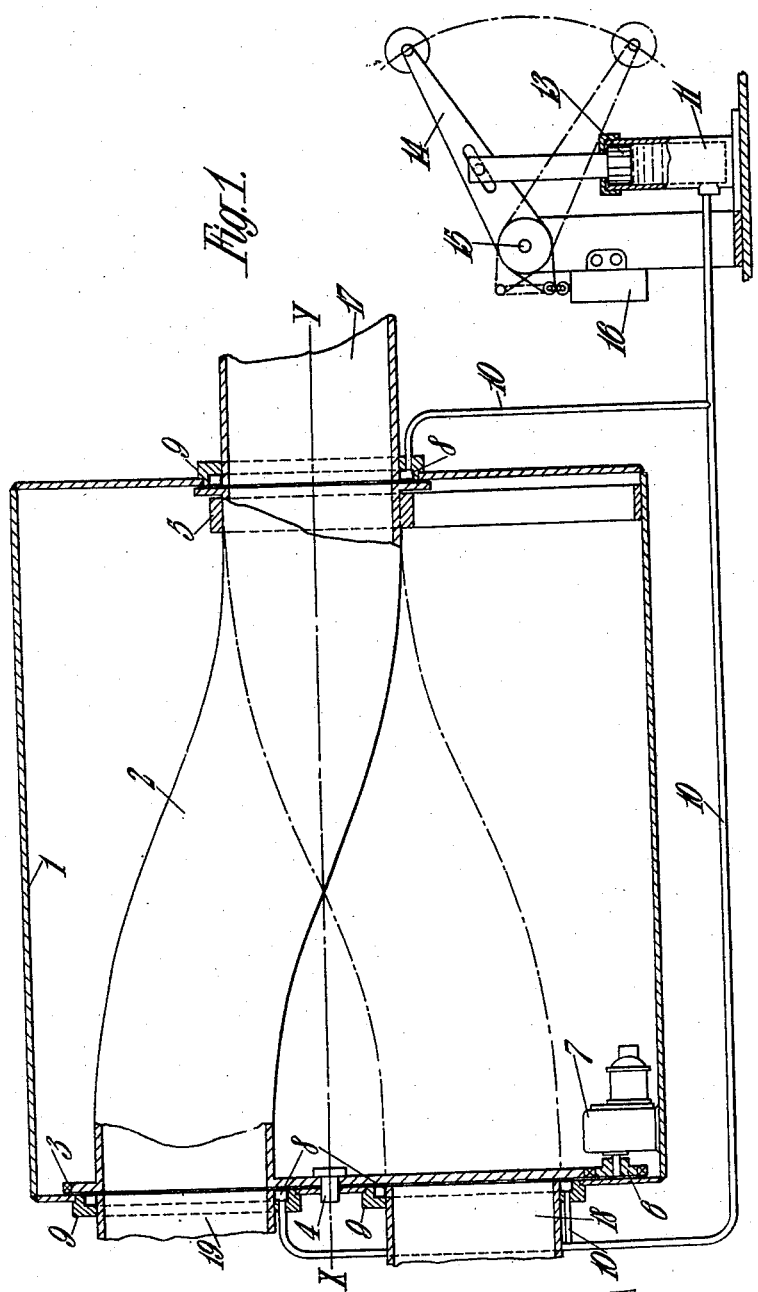

Inventor
E. J. Sebestyen

United States Patent Office 2,825,604
Patented Mar. 4, 1958

2,825,604

CHANGE-OVER MEANS FOR PNEUMATIC LINES

Emeric John Sebestyen, Cheadle Heath, England, assignor to Simon Handling Engineers Limited, Stockport, England, a British company Application July 26, 1956, Serial No. 600,339

Claims priority, application Great Britain August 2, 1955

2 Claims. (Cl. 302—28)

This invention relates to pneumatic conveying systems for handling cereal grain or other granular or powder products, and has for its object to provide improved means capable of automatic operation, for switching over rapidly from one conveying pipe line to another.

According to the invention, the pipe lines which are to be selectively connected are fixed in a rigid frame or casing, within which a pipe or pipes is or are arranged in such a way that it or they can be caused to interconnect any selected pipe lines by either rotating or sliding them to the predetermined point and joint sealing means are provided by means of hollow elastic rings, which can be expanded hydraulically or pneumatically once the selected position is attained.

Power units may be provided, whereby the expanded sealing rings can be automatically deflated, the pipe or pipes rotated or shifted to a selected new position, and the expandable sealing ring joints inflated and thus the pipe or pipes sealed in the new position.

The pipes to be connected may have their ends fixed in collars mounted in the rigid frame or casing, each collar having a recess in which a hollow ring, made of rubber or other elastic material, is fitted, so that the expansion of the hollow ring is confined to one part of its periphery only. Alternatively, the rotatable or slidable connecting pipes may be provided at each end with a collar, having similarly a recess into which a hollow ring of rubber or elastic material may be inserted. Fluid may be supplied to the rings through pipes from a cylinder in which is a piston, which may be loaded by a weight which can be raised by a solenoid device, or by hand, to release the pressure. Alternatively, when compressed air of sufficient pressure is available, the hollow sealing rings may be inflated by means of the compressed air via appropriate valves, which may be operated by a solenoid device or similar automatic operating medium.

In the frame is rotatably mounted a device carrying one or more pipe sections according to requirements. Where there is one such section, it may have one end in a bearing co-axial with one pipe line, and the other end fixed eccentrically in a rotatable disc, so as to come into line with other pipe lines in turn as the disc is rotated. Its one end may be flanged, the flange and disc facing the recesses in the collars, so that when expanded the hollow rings press against the flange and disc, thereby effecting seals between the connecting pipe and the pipe lines in use and closing the other pipe lines. Or the connecting pipe may be mounted eccentrically in discs at each end, or two or more pipes may be so mounted, so as to effect connections between one or more of a number of pipe lines at each end of the frame. Or a curved pipe may be used to effect a connection between a pipe line at the end of the frame and one at an angle thereto at the side of the frame, if desired in conjunction with a pipe connecting the said pipe line at the end of the frame alternatively with one in line with it at the other end of the frame.

The disc carrying the connecting pipe or pipes may be toothed at its edge so as to be driven through suitable gearing by a motor. An electric circuit may be provided for actuating a solenoid to release the fluid pressure and then driving the disc to a desired position, at which a limit switch may be provided to stop the motor and de-energize the solenoid so as to restore the fluid pressure.

Alternatively the pipe or pipes serving as connections can be provided with a suitable geared motor, driving wheels being attached to the rotatable pipe or pipes, which will move it or them to the required position. In this case the inflatable sealing rings can be fitted into the recess of a collar mounted on each end of the rotatable pipe or pipes.

In another alternative arrangement the connecting pipes are arranged slidably and their sliding movement is imparted by means of pneumatically or hydraulically operated cylinders or solenoid devices, or if required, by hand.

Referring to the attached drawing:

Figure 1 represents a sectional view of a typical changeover device in accordance with this invention.

Figure 4 and Figure 5 show diagrammatically two positions of another application of the invention.

Figure 6 shows an arrangement having a slidable pipe assembly.

Figures 2, 3:
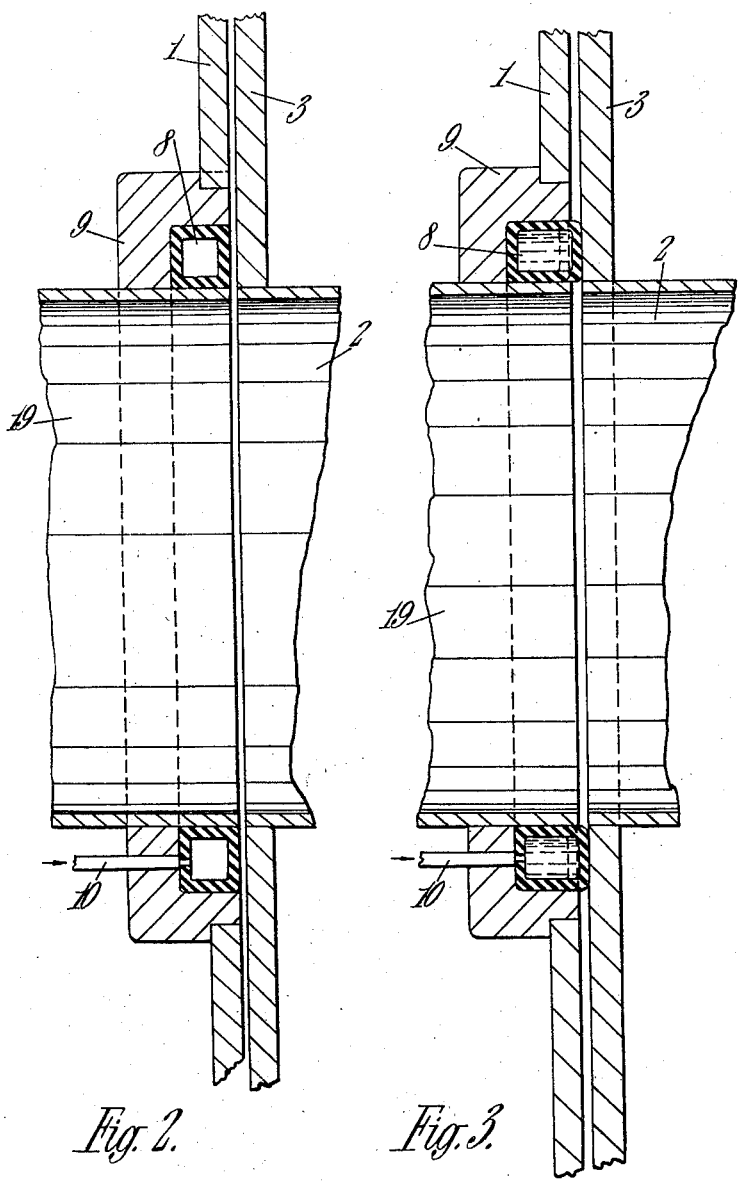
Figure 2 and Figure 3 show details of the sealing rings of the automatic changeover device.

Referring to Figure 1, 1 represents a rigid frame in which is mounted a revolving changeover pipe 2, in such a way that it can rotate about the axis X—Y. The revolving pipe 2 is carried at one end by a bearing 5 and at the other end by a disc 3, this latter revolving on a spindle 4.

Appropriate spur gear teeth are cut on the periphery of the disc 3 and these are engaged by a sprocket 6 which, in turn, is driven by means of a geared motor 7, the motor being mounted on the aforementioned rigid frame 1.

The pneumatic conveying pressure or suction line 17, and the lines 18, 19 with which it is required to be interchangeably connected, are fixed to the rigid frame 1 by means of collars 9 which are designed to accommodate hollow rings 8 made of rubber or of any artificial material which has elastic properties. These hollow rings will be completely filled with a fluid which is supplied through metal pipes 10 from a cylindrical vessel 11. A piston 13 is arranged in this vessel, in such a way as to be depressed by a weighted arm 14, mounted on a fulcrum 15, when the arm is released by the connected rod of an electro-magnetic solenoid 16, to drive fluid through the pipes 10 and expand the hollow rings 8.

The mode of operation of this device is as follows:

The revolving changeover pipe 2 is initially in the position shown by dotted lines. In order to effect a changeover, the electro-magnetic solenoid 16 is energised, thus withdrawing the force of the weighted lever 14 from the piston 13. The pressure on the fluid is thereby released and the hollow ring 8 contracts to its original shape, as shown, enlarged and in detail in Figure 2.

As soon as pressure on the fluid is released, the electric geared motor 7 is set in motion by the same electric circuit which energises the solenoid 16. The motor, in turn, rotates the revolving pipe 2 via sprocket 6 engaging the teeth on the periphery of the disc 3, until the pipe 2 reaches the desired position. At this point a limit switch is operated, breaking the electric circuit and thus simultaneously stopping the electric motor 7 and releasing the weighted lever 14 held by the solenoid 16.

The released weighted lever 14 depresses the piston 13 thus displacing the fluid contained in the cylindrical vessel 11 and forcing it through the connecting pipes 10 to the tubular rings 8. As the fluid is practically non-compressible, it causes the elastic walls of the hollow rings to expand, as shown in Figure 3, where they are not prevented from doing so by the retaining collars 9.

Under the force of the hydraulic pressure, the expanding walls of the hollow rings 8 press firmly onto both the retaining walls of the collars 9 and the faces of the revolving pipe 2, thus forming an effective hermetic seal preventing air leakage into or out of the pneumatic system, without being in direct contact with the conveyed material.

Instead of two pipes 18, 19, three or more pipes may be provided for being selectively coupled to the pipe 17 by rotation of the pipe 2. Any required number of hollow rings can be operated by one central cylinder and piston mechanism.

Referring to Figures 4 and 5, the frame 1 has two pipes 20, 21 attached at one end, and two pipes 22, 23 at the other end. There is a rotatable unit comprising two straight pipes 24, 25, and two pipes 26, 27 which each cross over from one side of the unit to the other. In the position shown in Figure 4, pipes 20 and 23 are connected by pipe 27 and pipes 21 and 22 are connected by pipe 26. In Figure 5, the rotatable unit has been turned through 90°, and the pipes 20 and 21 are connected to the pipes 22 and 23 directly opposite them by the straight pipes 24, 25. Sealing is effected as described above by resilient rings to which fluid is supplied through pipes 10, and the rotatable unit may be driven as described above.

Another arrangement is shown in elevation in Figure 6. The frame 1 carries a pneumatic conveying pipe 28 which can be selectively connected to a pipe line 29 in line with the pipe 28 or to a pipe 30 leading in the direction indicated by the arrow z. The centre lines of the pipes 28, 29 and 30 are in the same plane. In the rigid frame 1 is arranged slidably a frame 31 carrying a straight pipe 32 and a curved pipe 33 arranged behind the pipe 32.

In Figure 6, the straight pipe 32 is connected to the conveying pipes 28 and 29 and therefore the conveyed product will flow straight through. The pipe 33 lies behind and is not connected to the conveying pipes. A change-over is effected by sliding the frame 31 at right angles to the plane of the drawing to bring the curved pipe 33 into position to connect the conveying pipe 29 with the pipe 33 leading towards z.

The sealing of the joints between the slidable pipes 32, 33 and the fixed ones 28, 29 and 30 is effected in the same manner as described above, viz. by means of inflatable, hollow elastic sealing rings arranged in the recess of the collars mounted on the end of the conveying pipe lines attached to the rigid frame 1.

What I claim is:

1. An automatic changeover device for pneumatic conveying lines comprising a rigid casing, pipe lines to be selectively connected attached to opposite ends of said casing, collars around the ends of said pipes which fit in apertures in the casing attaching the pipes to said casing, hollow expansible rings located in recesses in said collars but having a face of each ring exposed to the inside of said casing, at least one changeover pipe carried in said casing and extending across the same so that it can interconnect selected pipe lines attached to the opposite ends of said casing, flanges upon the ends of each changeover pipe adapted to be engaged by the exposed faces of said expansible rings, a motor within the casing for turning each changeover pipe, a pump for inflating the expansible rings, means for actuating first the said pump to deflate the expansible rings and then the motor for effecting the changeover and means for automatically putting the motor out of action when a changeover has been effected and operating the pump to inflate the expansible rings.

2. An automatic changeover device as claimed in claim 1, comprising a cylinder, a weighted piston in said cylinder for driving fluid into said expansible rings, solenoid operated means for raising the piston to remove pressure from the fluid, an electric motor for turning each changeover pipe, means for actuating first the solenoid device and then the electric motor for effecting a changeover, and a limit switch for de-energizing the motor and then the solenoid when a changeover has been effected.

References Cited in the file of this patent

UNITED STATES PATENTS

| | | |
|---|---|---|
| 2,434,435 | Reibel | Jan. 13, 1948 |
| 2,586,144 | Benoit | Feb. 19, 1952 |
| 2,639,196 | Glaza | May 19, 1953 |
| 2,653,004 | Schnyder | Sept. 22, 1953 |
| 2,690,931 | Baresch | Oct. 5, 1954 |
| 2,705,016 | Saar | Mar. 29, 1955 |
| 2,750,233 | Yellot | June 12, 1956 |